United States Patent [19]

Nagasawa

[11] Patent Number: 4,905,022
[45] Date of Patent: Feb. 27, 1990

[54] IMAGE FORMING APPARATUS HAVING LASER LIGHT SOURCE

[75] Inventor: Kiyoto Nagasawa, Yokohama, Japan

[73] Assignee: Ricoh Company, Ltd., Tokyo, Japan

[21] Appl. No.: 329,808

[22] Filed: Mar. 28, 1989

[30] Foreign Application Priority Data

Apr. 8, 1988 [JP] Japan .................................. 63-85357

[51] Int. Cl.$^4$ ......................... G01D 15/14; H04N 1/21
[52] U.S. Cl. ..................................... 346/108; 358/296
[58] Field of Search ................. 346/108, 76 L, 107 R, 346/160; 358/296, 300, 302

[56] References Cited

U.S. PATENT DOCUMENTS

| | | |
|---|---|---|
| 4,679,057 | 7/1987 | Hamada . |
| 4,717,925 | 1/1988 | Shibata et al. ....................... 358/296 |
| 4,786,919 | 11/1988 | Bidner et al. ....................... 346/108 |

FOREIGN PATENT DOCUMENTS

56-71374 6/1981 Japan .
62-287773 12/1987 Japan .

*Primary Examiner*—Bruce A. Reynolds
*Assistant Examiner*—Mark Reinhart
*Attorney, Agent, or Firm*—Oblon, Spivak, McClelland, Maier & Neustadt

[57] ABSTRACT

An image forming apparatus comprising a photosensitive body, a scanner including a laser light source for scanning the photosensitive body by a laser beam emitted from the laser light source, a modulation circuit for pulse-width-modulating or pulse-number-modulating the laser beam by an input digital image data which is synchronized to a clock signal, and a driving circuit for driving the laser light source by an output modulated image data of the modulation circuit. The modulation circuit includes a high-speed clock generator for generating a high-frequency clock signal which has a frequency higher than the clock signal, a counter for counting pulses of the high-frequency clock signal, a resetting circuit for resetting the counter when a counted value reaches a predetermined value, and a pulse signal generator for generating as the modulated image data a pulse signal having a pulse width or number dependent on the input digital image data and the counted value of the counter.

15 Claims, 8 Drawing Sheets

| VDATA | OUTPUT PATTERN OF IMAGE DATA "VIDEO" |
|---|---|
| 1 | 000---010----00 |
| 2 | 000---0110---00 |
| 3 | 000--01110---00 |
| 10 | 000--011--110---00 |
| 60 | 0011------------1100 |

←—— 1 DOT (64 DATA) ——→

IMAGE FORMING APPARATUS HAVING LASER LIGHT SOURCE

BACKGROUND OF THE INVENTION

The present invention generally relates to image forming apparatuses having a laser light source, and more particularly to an image forming apparatus such as a laser printer and a digital copying machine having a modulation circuit for modulating an output laser beam of the laser light source by an image information.

Conventionally, there basically are first and second modulation circuits for modulating an output laser beam of a laser light source by an image information.

Figure 1:
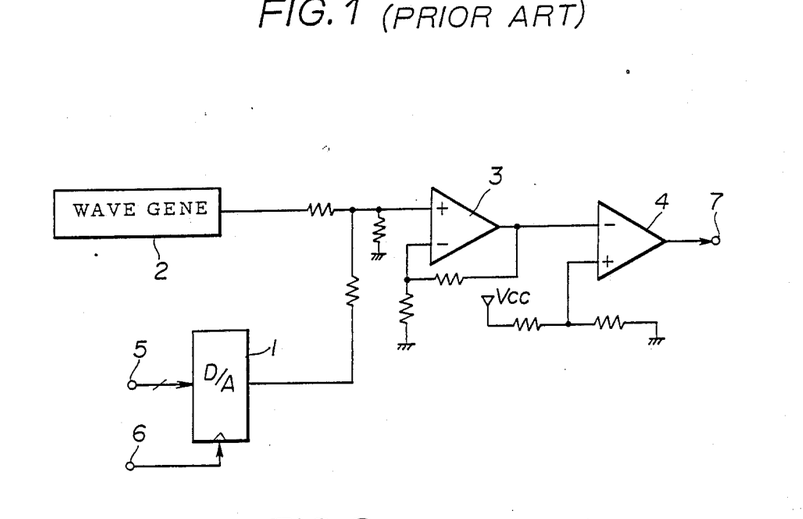
FIG. 1 is a circuit diagram showing an example of a conventional modulation circuit.

The first modulation circuit is shown in FIG. 1 and generally has a digital-to-analog (D/A) converter 1, a triangular wave generator 2, an adder 3 and a comparator 4. An input digital image signal applied to a terminal 5 is converted into an analog image signal by the D/A converter 1 responsive to a clock signal which is applied to a terminal 6. The analog image signal is added in the adder 3 with a triangular wave which is outputted from the triangular wave generator 2. An output signal of the adder 3 is compared with a reference level in the comparator 4, and a pulse width modulated signal is outputted from a terminal 7. This pulse width modulated signal from the terminal 7 is a pulse signal which has been subjected to a pulse width modulation depending on the input digital image signal. Hence, when the pulse signal from the terminal 7 is used to drive the laser light source, it is possible to modulate the output laser beam of the laser light source by the input digital image signal.

However, the first modulation circuit carries out the pulse width modulation by an analog signal processing. For this reason, there are problems in that the circuit operation of the first modulation circuit is easily affected by a change in the ambient temperature and it is difficult to guarantee a stable circuit operation. In addition, when the frequency of the image signal becomes high, there is a limit to increasing the operation speed of the analog circuit and the first modulation circuit is not suited for processing a high-frequency image signal.

Figure 2:
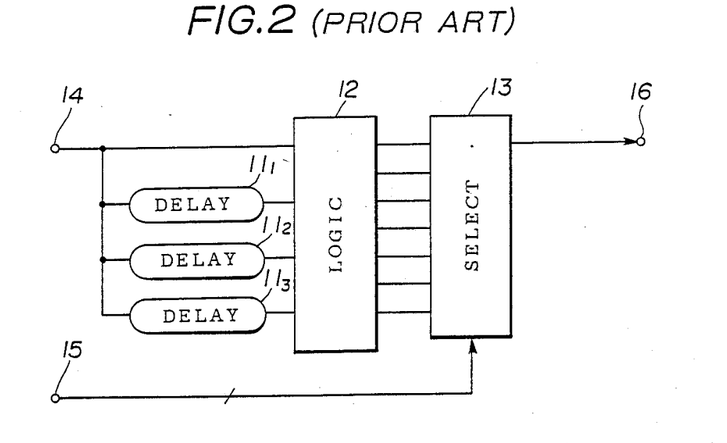
FIG. 2 is a circuit diagram showing another example of a conventional modulation circuit.

On the other hand, the second modulation circuit is shown in FIG. 2 and generally has delay elements $11_1$ through $11_3$, a logic circuit 12 and a selector 13. A clock signal applied to a terminal 14 is supplied directly to the logic circuit 12 and also supplied to the logic circuit 12 after being delayed in the delay elements $11_1$ through $11_3$. The logic circuit 12 carries out an AND and/or an OR operation on the incoming signals and generates a plurality of pulse signals having mutually different pulse widths. These pulse signals from the logic circuit 12 are supplied to the selector 13 which selects one of the pulse signals depending on an input digital image signal received through a terminal 15. As a result, the selected pulse signal is outputted from a terminal 16 and is used to drive the laser light source.

According to the second modulation circuit, it is possible to eliminate the problems of the first modulation circuit which are peculiar to the analog circuit. However, in order to obtain a large number of pulse signals having mutually different pulse widths, it is necessary to provide a large number of delay elements for delaying the clock signal from the terminal 14 and there is a problem in that the circuit construction of the second modulation circuit becomes complex. Furthermore, when the frequency of the image signal becomes high, delay times of the delay elements must be set to extremely small values but tolerances of the delay elements make it impossible to accurately obtain extremely short delay times. Thus, the second modulation circuit is also not suited for processing a high-frequency image signal.

Therefore, according to the conventional modulation circuits, there is a limit to increasing the image signal frequency, that is, there is a limit to increasing a number of gradation levels with which an image may be formed by the image forming apparatus.

SUMMARY OF THE INVENTION

Accordingly, it is a general object of the present invention to provide a novel and useful image forming apparatus in which the problems described above are eliminated.

Another and more specific object of the present invention is to provide an image forming apparatus comprising a photosensitive body, scanning means including a laser light source for scanning the photosensitive body by a laser beam emitted from the laser light source, modulation means for pulse-width-modulating the laser beam by an input digital image data which is synchronized to a clock signal, and driving means for driving the laser light source by an output pulse width modulated image data of the modulation means. The modulation means includes a high-speed clock generator for generating a high-frequency clock signal which has a frequency higher than the clock signal, counter means for counting pulses of the high-frequency clock signal, a resetting circuit for resetting the counter means when a counted value reaches a predetermined value, and pulse signal generating means for generating a pulse signal having a pulse width dependent on the input digital image data and the counted value of the counter means, where the pulse signal is outputted as the pulse width modulated image data. According to the image forming apparatus of the present invention, it is possible to obtain stable and accurate pulse width modulated image data even when the frequency of the input digital image data is high, and each dot can be described in multilevels, that is, a large number of gradation levels.

Still another object of the present invention is to provide an image forming apparatus comprising a photosensitive body, scanning means including a laser light source for scanning the photosensitive body by a laser beam emitted from the laser light source, modulation means for pulse-number-modulating the laser beam by an input digital image data which is synchronized to a clock signal, and driving means for driving the laser light source by an output pulse number modulated image data of the modulation means. The modulation means includes a high-speed clock generator for generating a high-frequency clock signal which has a frequency higher than the clock signal, counter means for counting pulses of the high-frequency clock signal, a resetting circuit for resetting the counter means when a counted value reaches a predetermined value, and pulse signal generating means for generating a pulse signal having a pulse number dependent on the input digital image data and the counted value of the counter means, where the pulse signal is outputted as the pulse number modulated image data. According to the image forming apparatus of the present invention, it is possible to obtain stable and accurate pulse number modulated image data even when the frequency of the input digital image data is high, and each dot can be described in multilevels, that is, a large number of gradation levels.

Other objects and further features of the present invention will be apparent from the following detailed description when read in conjunction with the accompanying drawings.

DETAILED DESCRIPTION

Figure 3:
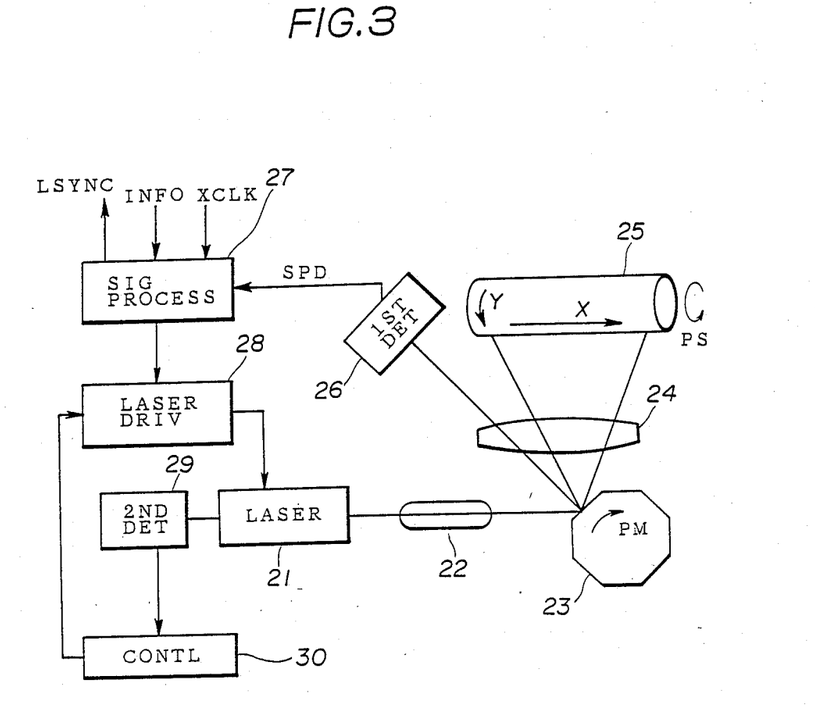
FIG. 3 is a system block diagram generally showing an embodiment of an image forming apparatus according to the present invention.

First, a general description will be given of an embodiment of an image forming apparatus according to the present invention, by referring to FIG. 3. In FIG. 3, a laser beam emitted from a semiconductor laser 21 to a front thereof is supplied to a collimator lens 22 and a light beam from the collimator lens 22 is directed to an optical scanning device having a polygonal mirror 23. The polygonal mirror 23 deflects the light beam from the collimator lens 22 and images the light beam on a charged surface of a photosensitive body 25 through an $f\theta$ lens 24. In this embodiment, the photosensitive body 25 has a form of a rotatable photosensitive drum. A spot formed by the imaging repeatedly moves in a main scanning direction X as the polygonal mirror 23 rotates in a direction PM while the spot also scans in a sub scanning direction Y as the photosensitive body 25 rotates in a direction PS.

A first photodetector 26 is provided outside an information write region along an axial direction of the photosensitive body 25. For example, the first photodetector 26 detects a laser beam deflected by the polygonal mirror 23 and generates a beam detection pulse signal SPD responsive to the detected laser beam. The signal processor 27 generates a line synchronizing signal LSYNC based on the beam detection pulse signal SPD. This line synchronizing signal LSYNC indicates a position where the write operation starts on each line. A digital information signal (image data) INFO and a clock signal XCLK are supplied to the signal processor 27 from a scanning device (not shown), an image processor (not shown) or the like which generates these signals. The line synchronizing signal LSYNC is supplied to the scanning device, the image processor or the like. On the other hand, the signal processor 27 modulates the image data INFO and supplies a modulated image data to a laser driving circuit 28.

The laser driving circuit 28 drives the semiconductor laser 21 depending on the modulated image data from the signal processing circuit 27, and a laser beam modulated by the image data INFO is emitted from the semiconductor laser 21 thereby forming a corresponding electrostatic image on the surface of the photosensitive body 25. The electrostatic image is developed in a known developing unit (not shown) and is transferred onto a recording sheet such as a paper in a known image transfer unit (not shown).

A laser beam which is emitted from the semiconductor laser 21 to a rear thereof is detected by a second photodetector 29 which outputs a signal dependent on an intensity of the laser beam. A control circuit 30 controls the laser driving circuit 28 responsive to the output signal of the second photodetector 29 so that a quantity of light outputted from the semiconductor laser 21 becomes constant.

In this embodiment, the laser beam emitted from the rear of the semiconductor laser 21 is detected by the second photodetector 29 so as to detect the intensity of the laser beam. Hence, the second photodetector 29 may be sealed within a package of the semiconductor laser 21. In this case, unlike in a system which directs a portion of the laser beam emitted to the front of the semiconductor laser 21 to the second photodetector 29, there is no decrease in the intensity of the laser beam which is actually used to write the information on the photosensitive body 25. Of course, the laser light source is not limited to the semiconductor laser 21.

Figure 4:
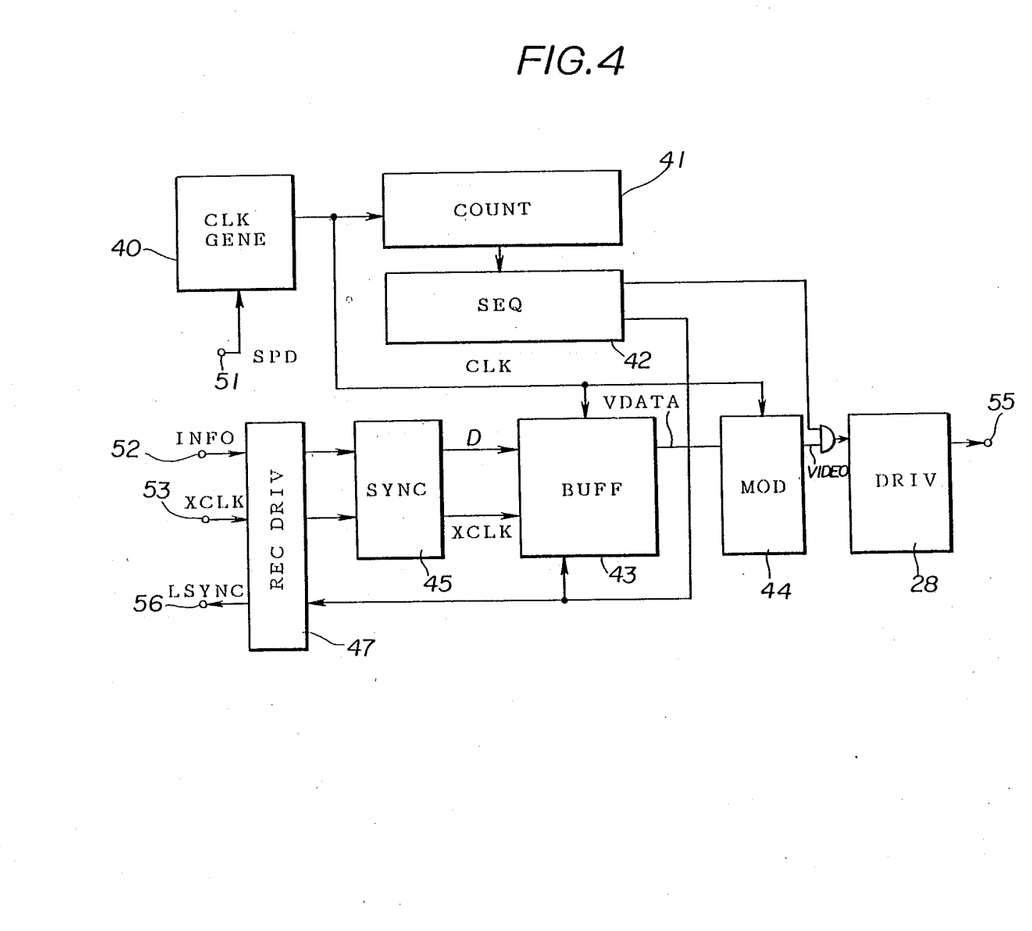
FIG. 4 is a system block diagram showing an embodiment of an essential part of the image forming apparatus shown in FIG. 3.

FIG. 4 shows an embodiment of an image data control system of the embodiment of the image forming apparatus according to the present invention. This image data control system substantially corresponds to the image processor 27 and the laser driving circuit 28 shown in FIG. 3. In FIG. 4, the image data control system generally has a clock generator 40, a main scan counter 41, a main scan sequencer circuit 42, a buffer 43 made up of at least two line buffers, a modulation circuit 44, a data synchronizing circuit 45, the driving circuit 28 and a receiver driving circuit 47.

Figure 5:
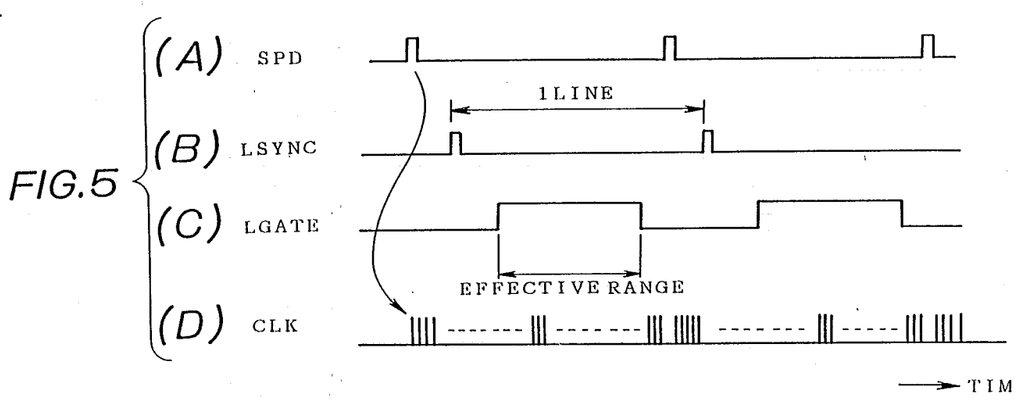
FIGS. 5(A) through 5(D) and FIGS. 6(A) and 6(B) respectively are timing charts for explaining an operation of the block system shown in FIG. 4.
Figure 6:
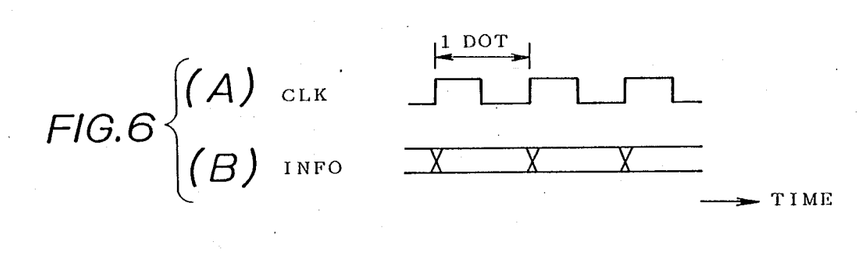

In a laser recording system, there is a need to accurately match the phases of the dots in each scanning line. Hence, the position of the laser beam must be detected to determine a write start timing, and the beam detection pulse signal SPD from the first photodetector 26 and received through a terminal 51 is used for this reason. In other words, an output clock signal CLK of the clock generator 40 in phase synchronism with the beam detection pulse signal SPD is supplied to the main scan counter 41 to determine a dot address which is an address of each dot starting from an address "0" where the writing starts. The clock signal CLK is shown in FIGS. 5(D) and 6(A), and the beam detection pulse signal SPD is shown in FIG. 5(A). The time base of FIGS. 5(A) through 5(D) is different from that of FIGS. 6(A) and 6(B) for convenience' sake. The dot address is supplied to the main scan sequencer circuit 42 which determines the main scan sequence and controls the entire one scanning line based on the dot address. The main scan sequence includes the administration of data within one scanning line and setting an effective range of the scanning line. Hence, the main scan sequencer circuit 42 generates the line synchronizing signal LSYNC shown in FIG. 5(B) and a signal LGATE shown in FIG. 5(C) which indicates the effective range of the scanning line.

On the other hand, the digital image data INFO shown in FIG. 6(B) obtained from the scanning device, the image processor or the like is supplied to the receiver driver 47 through a terminal 52. The clock signal XCLK from the scanning device, the image processor or the like is also supplied to the receiver driver 47 through a terminal 53. The image data INFO is written into the buffer 43 in synchronism with the clock signal XCLK through the data synchronizing circuit 45. The line synchronizing signal LSYNC from the main scan sequencer circuit 42 is passed through the receiver and driver 47 and is outputted from a terminal 56 to be supplied to the scanning device, the image processor or the like.

The buffer 43 is provided to absorb the difference between the clock signal XCLK and the clock signal CLK which is obtained from the clock generator 40 while maintaining phase synchronism with the clock signal XCLK. The buffer 43 is also supplied with the line synchronizing signal LSYNC from the main scan sequencer circuit 42. One line data VDATA within the buffer 43 is read out in synchronism with the clock signal CLK and is supplied to the driving circuit 46 through the modulation circuit 44 and an AND circuit 54 which is also supplied with the signal LGATE from the main scan sequencer circuit 42. An output signal of the driving circuit 46 is supplied to the semiconductor laser 21 through a terminal 55 so as to form an electrostatic image on the photosensitive body 25 by turning the semiconductor laser 21 ON and OFF.

Generally, there is a demand to form halftone images on the laser recording system. A popularly used method is the tone production method by density of each element, in which the halftones are described by a ratio of black and white per unit area with the dither system with respect to a matrix region of 4×4 dots, 8×8 dots or the like. It is possible to describe 16 gradation levels with the matrix region of 4×4 dots and it is possible to describe 64 gradation levels with the matrix region of 8×8 dots. This tone production method is suited for the image formation when the image is a photograph, a picture and the like, but there is a disadvantage in that the resolution of the image becomes poor according to this tone production method.

Accordingly, methods have been proposed to describe one dot of the laser beam in multilevels so as to eliminate the disadvantageous features of the tone production method described above. According to one method, the laser beam is subjected to a pulse width modulation by the image data so as to control the energy of one dot on the photosensitive body in multilevels. The conventional circuits shown in FIGS. 1 and 2 described before use this pulse width modulation. On the other hand, there is another method in which the laser beam is subjected to a pulse number modulation by the image data so as to control the energy of one dot on the photosensitive body in multilevels.

Figure 7:
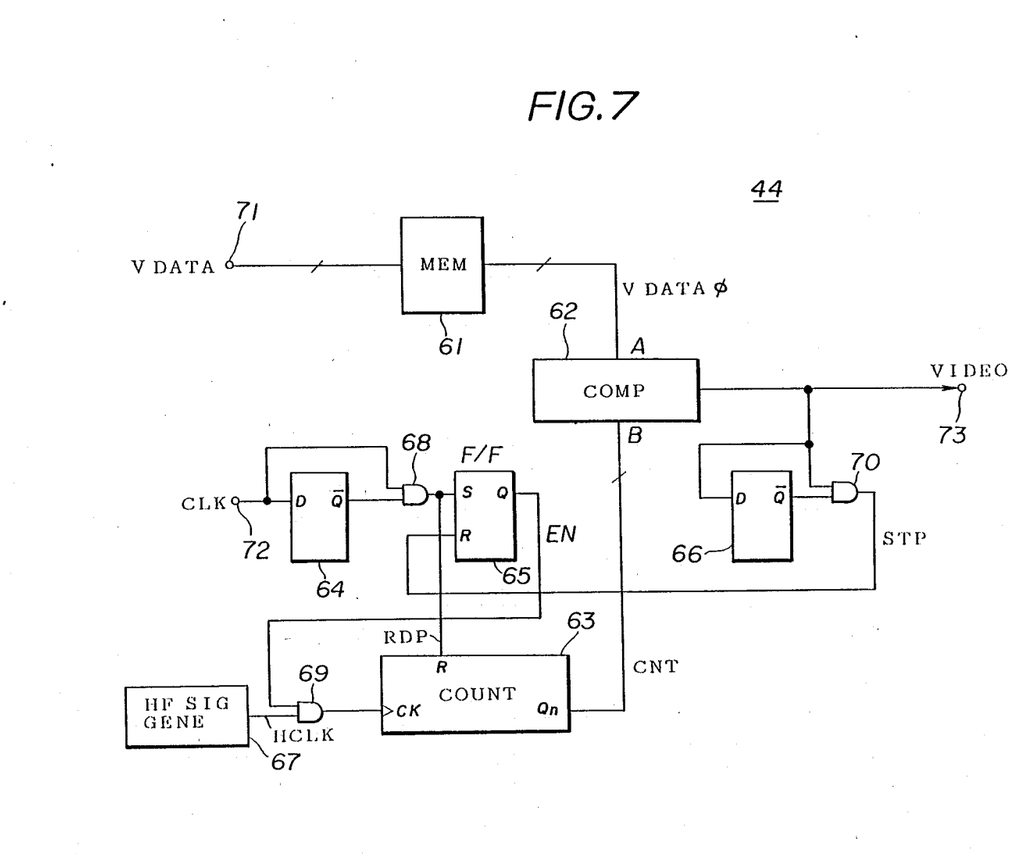
FIG. 7 is a system block diagram showing a first embodiment of a modulation circuit shown in FIG. 4.

FIG. 7 shows a first embodiment of the modulation circuit 44 which carries out the pulse width modulation, and FIGS. 8(A) through 8(F) are timing charts for explaining an operation of the modulation circuit 44 shown in FIG. 7.

In FIG. 7, the modulation circuit 44 generally has a memory 61 which is a random access memory (RAM), a read only memory (ROM) or the like which stores a table, a comparator 62, a counter 63, flip-flops 64 through 66, a high-speed clock generator 67 which generates a signal having a frequency higher than that of the clock signal CLK, and AND circuits 68 through 70.

Figure 8:
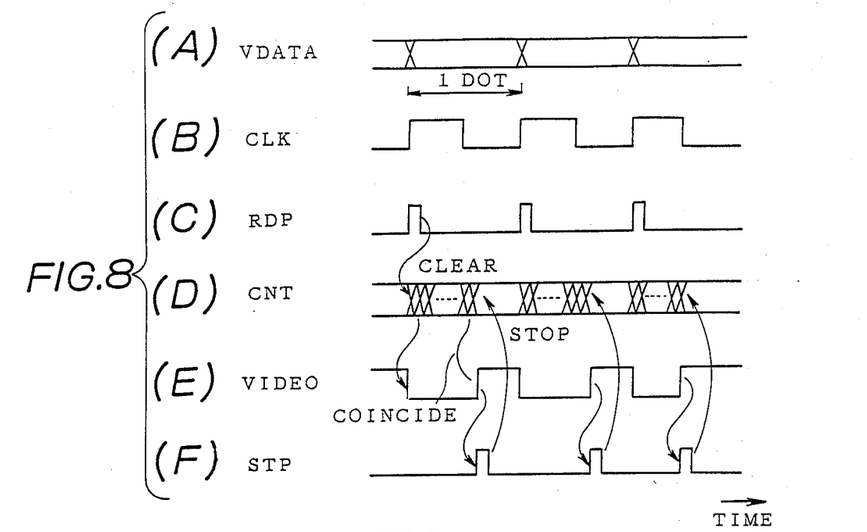
FIGS. 8(A) through 8(F) are timing charts for explaining an operation of the modulation circuit shown in FIG. 7.

The digital image data VDATA shown in FIG. 8(A) from the buffer 43 is supplied to an address side of the memory 61 through a terminal 71. The memory 61 stores a data conversion table which is used to convert the digital image data VDATA into a digital image data VDATA0. This data conversion includes a gamma correction, for example, so that an appropriate data conversion is carried out depending on the photosensitive body used, the input/output characteristics of the semiconductor laser 21 and the like. It is of course possible to omit such a data conversion and the memory 61 may be omitted in this case. The image data VDATA0 is supplied to a terminal A of the comparator 62.

On the other hand, the clock signal CLK shown in FIG. 8(B) from the clock generator 40 is supplied to a data input terminal D of the flip-flop 64 through a terminal 72. A $\overline{Q}$-output of the flip-flop 64 and the clock signal CLK are supplied to the AND circuit 68 which supplies an output start pulse signal RDP thereof to a set terminal S of the flip-flop 65 and to a reset terminal R of the counter 63. This start pulse signal RDP is shown in FIG. 8(C) and is obtained by detecting rising edges of the clock signal CLK. Hence, the counter 63 is cleared and the flip-flop 65 is simultaneously set responsive to the start pulse signal RDP. The flip-flop 65 hence outputs a count enable signal EN which is supplied to the AND circuit 69. This AND circuit 69 is also supplied with a high-frequency clock signal HCLK from the high-speed clock generator 66. An output signal of the AND circuit 69 is supplied to a clock terminal CK to start the counting operation of the counter 63.

A counter output CNT of the counter 63 shown in FIG. 8(D) is supplied to a terminal B of the comparator 61 which constantly compares the counter output CNT and the image data VDATA0. A signal indicative of the compared result is outputted from the comparator 62 as an output image data VIDEO shown in FIG. 8(E). The comparator 62 outputs a high-level signal when the signal levels at the terminals A and B coincide, and outputs a low-level signal when the signal levels at the terminals A and B differ. This comparator 62 can easily be realized by use of the known transistor-transistor logic (TTL), emitter-coupled logic (ECL) and the like.

The image data VIDEO is also supplied to a data input terminal D of the flip-flop 66 and to the AND circuit 70 which receives a $\overline{Q}$-output signal of the flip-flop 66. Hence, the AND circuit 70 outputs a stop signal STP shown in FIG. 8(F) responsive to a rising edge of the image data VIDEO. This stop signal STP is supplied to a reset terminal R of the flip-flop 65 so as to reset the flip-flop 65. Thus, the count enable signal EN is set to a low level responsive to the stop signal STP, and the high-frequency clock signal HCLK is no longer supplied to the counter 63. For this reason, the counter 63 substantially stops the counting operation and the counter output CNT is maintained to the value when the counter output CNT coincided with the the image data VDARA0. In other words, as a result of the comparison carried out in the comparator 62, the image data VIDEO is maintained to the high level. When the counter 63 is cleared responsive to the next rise in the clock signal CLK (that is, responsive to the start pulse signal RDP), the counter output CNT no longer coincides with the image data VDATA0 and the level of the image data VIDEO outputted from a terminal 73 becomes low. This image data VIDEO is supplied to the driving circuit 46 through the AND circuit 54 shown in FIG. 4.

Therefore, the image data VIDEO always has the low level at the rising edge of the clock signal CLK and returns to the high level after counting a number of the high-frequency clock signal HCLK depending on the image data VDATA. Thus, the image data VIDEO is a pulse width modulated (PWM) signal which has a pulse width dependent on the image data VDATA and is synchronized to the clock signal CLK. Because the semiconductor laser 21 is turned ON/OFF responsive to this PWM signal, it is possible to record (or write) one dot in multilevels.

In this case, each level of the multilevel description of one dot can be designated in terms of one pulse of the high-frequency clock signal HCLK. When it is assumed that the high-frequency clock signal HCLK has a frequency which is ten times that of the clock signal CLK, it is possible to describe one dot in ten gradation levels. The modulation circuit 44 shown in FIG. 7 may easily be realized by the ECL logic, and in this case it is possible to describe a sufficient number of gradation levels since it is possible to employ a signal having a frequency in the order of 100 MHz to 300 MHz as the high-frequency clock signal HCLK.

The modulation circuit 44 is not limited to the circuit shown in FIG. 7. The modulation circuit 44 shown in FIG. 7 does not use special elements such as a delay line, and for this reason, the modulation circuit 44 may easily be produced in a form of an integrated circuit such as a gate array circuit.

In this embodiment, the image data (PWM signal) VIDEO shown in FIG. 8(E) has the high-level during a time when the semiconductor laser 21 is to be turned ON, and this high-level period occurs at the end portion of the time period for recording one dot indicated by "1 DOT" in FIG. 8(B). However, it is of course possible to take measures so that the high-level period of the image data VIDEO occurs at the beginning or central portion of the time period for recording one dot.

Next, a description will be given of a second embodiment of the modulation circuit 44, by referring to FIG. 9. FIGS. 10(A) through 10(E) are timing charts for explaining an operation of the modulation circuit 44 shown in FIG. 9. In addition, FIG. 11 shows a memory map of a memory of the modulation circuit 44 shown in FIG. 9.

Figure 9:
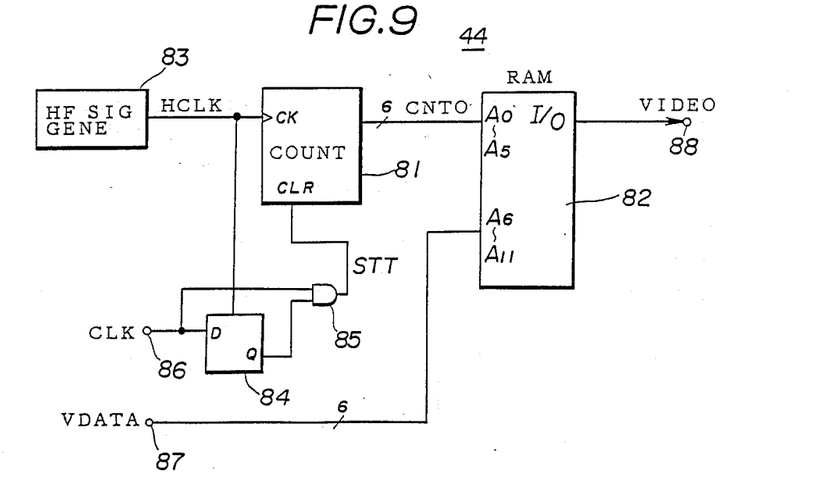
FIG. 9 is a system block diagram showing a second embodiment of the modulation circuit shown in FIG. 4.

In FIG. 9, the modulation circuit 44 generally has a counter 81, a RAM 82, a high-speed clock generator 83, a flip-flop 84 and an AND circuit 85. In this embodiment, the high-speed clock generator 83 generates a high-frequency clock signal HCLK having a frequency 64 times that of the clock signal CLK shown in FIG. 10(A). The clock signal CLK is applied to a terminal 86 and is supplied to a data input terminal D of the flip-flop 84 and to the AND circuit 85. The AND circuit 85 is also supplied with a Q-output signal of the flip-flop 84.

Figure 10:
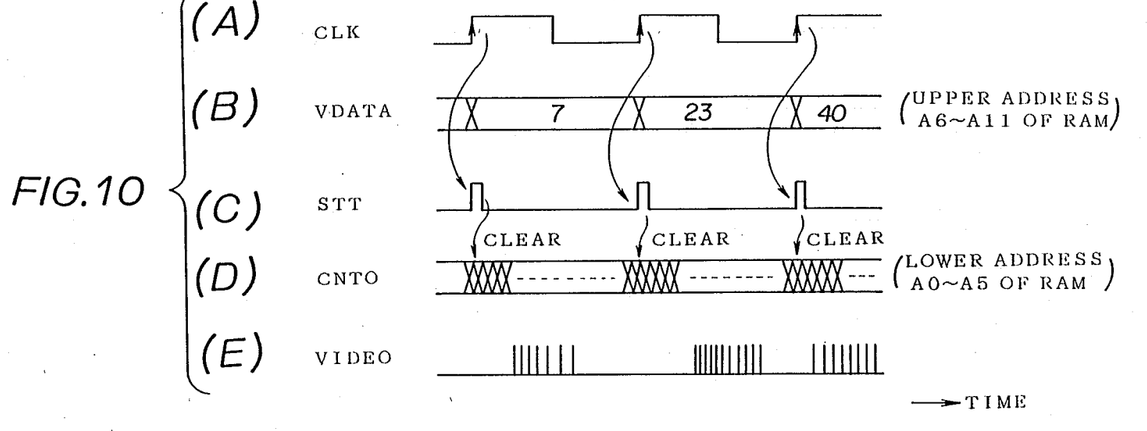
FIGS. 10(A) through 10(E) are timing charts for explaining an operation of the modulation circuit shown in FIG. 9.
Figure 11:
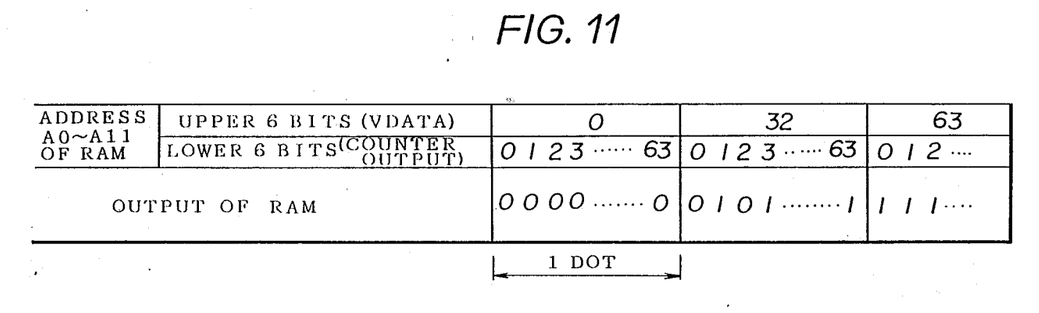
FIG. 11 shows a memory map of a random access memory of the modulation circuit shown in FIG. 9.

The AND circuit 85 outputs a start signal STT shown in FIG. 10(C) responsive to a rising edge of the clock signal CLK. This start signal STT is supplied to a clear terminal CLR of the counter 81 to clear the counter 81. The counter 81 counts up the high-frequency clock signal HCLK from "0" and a 6-bit counter output CNTO shown in FIG. 10(D) is supplied to lower address bits A0 through A5 of the RAM 82. In this embodiment, the counter 81 which outputs the 6-bit counter output CNTO may easily be realized by use of two 4-bit counters.

The digital image data VDATA shown in FIG. 10(B) is applied to a terminal 87 and is supplied to upper address bits A6 through A11 of the RAM 82. FIG. 10(E) shows the image data VIDEO which is outputted from an input/output port I/O of the RAM 82 and obtained through a terminal 88. In this embodiment, the image data VIDEO is a pulse number modulated (PNM) signal which has a number of pulses dependent on the image data INFO.

FIG. 11 shows a memory map of the RAM 82. An information "1" or "0" is written at the lower address designated by the 6-bit counter output of the counter 81 for each memory area addressed by the image data VDATA. For example, the semiconductor laser 21 is turned ON when the output image data VIDEO of the RAM 82 is "1" and is turned OFF when the output image data VIDEO is "0". In this case, the output image data VIDEO of the RAM 82 are all "0" when VDATA=0, and when VDATA=32 the image data VIDEO are "1" if the 6-bit counter output CNTO is "1", "3", "5", ..., "63" and is otherwise "0". When VDATA=63, the image data VIDEO are "1". By writing such information in the RAM 82, it is possible to make 64 kinds of ratios of the "0"s and "1"s within one dot (picture element) depending on the image data, that is, one dot can be described in 64 gradation levels.

Figure 12:
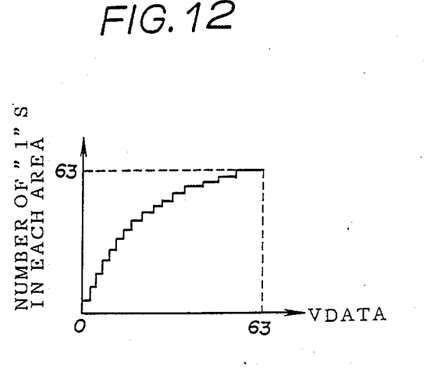
FIG. 12 shows a relationship between an image data and a number of "1"s in each memory area of the random access memory.

This embodiment has two important features, one being the function of converting the image data by the gamma correction and the like and the other being the function of freely setting the substantial dot shape. In other words, with regard to the image data conversion function, a relationship between the image data VDATA and the number of "1"s in each memory area of the RAM 82 does not have to be set to a linear relationship as described above and the relationship may be non-linear as shown in FIG. 12. Hence, it may be seen that the image data VDATA can be subjected to a gamma correction when obtaining the image data VIDEO which is supplied to the driving circuit 46 shown in FIG. 4.

Figure 13:
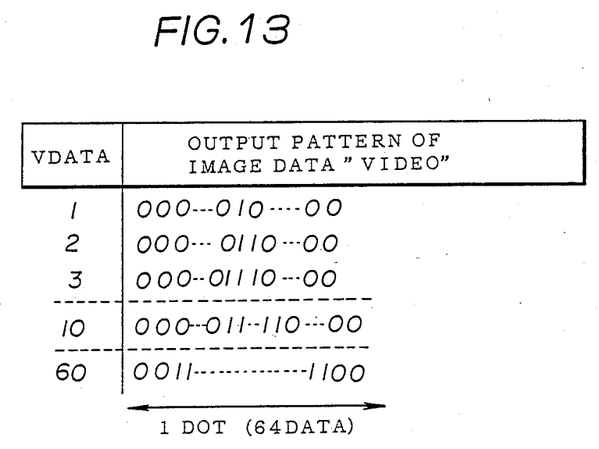
FIG. 13 shows a relationship between the image data and an output pattern of the modulation circuit shown in FIG. 9.

On the other hand, with regard to the dot shape setting function, the number of "1"s within each memory area of the RAM 82 addressed by the image data VDATA indicates the gradation level but the dot shape can be set depending on the arrangement of the "1"s. For example, in the pattern shown in FIG. 13, the dot pattern gradually spreads from an approximate center in accordance with a change of the gradation level from "0" to "63". However, it is not essential that the dot pattern gradually spread from the approximate center. For example, the dot pattern (that is, the number of "1"s) may gradually spread from one side as in the case of the normal pulse width modulation, and the dot pattern (that is, the number of "1"s) may gradually spread uniformly throughout as in the case of the frequency modulation or pulse frequency modulation.

The two important features of this embodiment can be freely realized by controlling the write operation with respect to the RAM 82. In the embodiment shown in FIG. 9, the illustration of a write circuit with respect to the RAM 82 is omitted but the normal method of coupling a data line to the input/output port I/O of the RAM 82 through a bus buffer (not shown) may be employed. In this case, a bus buffer (not shown) may be coupled between the terminal 88 and the driving circuit 46 if needed. A write data to be written into the RAM 82 is produced in a central processing unit (CPU, not shown) or the like, and the bus buffer and a read/write terminal R/W of the RAM 82 are controlled by a predetermined timing signal from the CPU.

For example, the write data may be written into the RAM 82 during an initializing time period when the power source is turned ON. Alternatively, a write data having an appropriate pattern may be written into the RAM 82 responsive to an instruction from the user or a host device. Furthermore, when there is no need to make a pattern conversion, it is possible to employ a ROM in place of the RAM.

Therefore, in this embodiment, it is simply necessary to increase the number of bits of the RAM 82 when increasing the number of gradation levels to be described, and the circuit construction of the modulation circuit 44 may be the same. For example, a 64k×1 bit RAM is used when the gradation is described in 8 bits, and a 256×1 bit RAM is used when the gradation is described in 4 bits.

In the described embodiments, the laser light source is turned ON during the high-level period of the PWM or PNM signal, but it is of course possible to turn the laser light source ON during the low-level period of the PWM or PNM signal.

Further, the present invention is not limited to these embodiments, but various variations and modifications may be made without departing from the scope of the present invention.

What is claimed is:

1. An image forming apparatus comprising:
a photosensitive body;
scanning means including a laser light source for scanning said photosensitive body by a laser beam emitted from the laser light source;
modulation means for pulse-width-modulating the laser beam by an input digital image data which is synchronized to a clock signal; and
driving means for driving the laser light source by an output pulse width modulated image data of said modulation means,
said modulation means including a high-speed clock generator for generating a high-frequency clock signal which has a frequency higher than the clock signal, counter means for counting pulses of the high-frequency clock signal, a resetting circuit for resetting said counter means when a counted value reaches a predetermined value, and pulse signal generating means for generating a pulse signal having a pulse width dependent on the input digital image data and the counted value of said counter means, said pulse signal being outputted as said pulse width modulated image data.

2. The image forming apparatus as claimed in claim 1 wherein said high-speed clock generator generates a high-frequency clock signal having a frequency over approximately 100 MHz.

3. The image forming apparatus as claimed in claim 1 wherein said pulse signal generating means includes a comparator for comparing the input digital image data and the counted value of said counter means and for outputting a pulse signal with a pulse width determined by a time period in which the input digital image data and the counted value coincide in said comparator.

4. The image forming apparatus as claimed in claim 1 wherein said pulse signal generating means includes a processing circuit for subjecting the input digital image data to a predetermined processing, and a comparator for comparing an output image data of said processing circuit and the counted value of said counter means and for outputting a pulse signal with a pulse width determined by a time period in which the output image data of said processing circuit and the counted value of said counter means coincide in said comparator.

5. The image forming apparatus as claimed in claim 4 wherein said processing circuit subjects the input image data to a processing including a gamma correction.

6. The image forming apparatus as claimed in claim 5 wherein said processing circuit includes a memory which prestores image data which have been subjected to the predetermined processing in a form of a look-up table.

7. The image forming apparatus as claimed in claim 1 wherein said pulse generating means generates the pulse signal so that a high-level period thereof exists in an arbitrary portion of a total time period for forming one dot depending on the input digital image data.

8. The image forming apparatus as claimed in claim 1 wherein said pulse generating means generates the pulse signal so that a high-level period thereof exists in an approximate center portion of a total time period for forming one dot depending on the input digital image data.

9. An image forming apparatus comprising:
a photosensitive body;
scanning means including a laser light source for scanning said photosensitive body by a laser beam emitted from the laser light source;
modulation means for pulse-number-modulating the laser beam by an input digital image data which is synchronized to a clock signal; and
driving means for driving the laser light source by an output pulse number modulated image data of said modulation means,
said modulation means including a high-speed clock generator for generating a high-frequency clock signal which has a frequency higher than the clock signal, counter means for counting pulses of the high-frequency clock signal, a resetting circuit for resetting said counter means when a counted value reaches a predetermined value, and pulse signal generating means for generating a pulse signal having a pulse number dependent on the input digital image data and the counted value of said counter means, said pulse signal being outputted as said pulse number modulated image data.

10. The image forming apparatus as claimed in claim 9 wherein said high-speed clock generator generates a high-frequency clock signal having a frequency over approximately 100 MHz.

11. The image forming apparatus as claimed in claim 9 wherein said pulse signal generating means includes a processing circuit for subjecting the input digital image data to a predetermined processing and for outputting the pulse signal.

12. The image forming apparatus as claimed in claim 11 wherein said processing circuit subjects the input image data to a processing including a gamma correction.

13. The image forming apparatus as claimed in claim 12 wherein said processing circuit includes a memory which prestores image data which have been subjected to the predetermined processing in a form of a look-up table.

14. The image forming apparatus as claimed in claim 9 wherein said pulse generating means generates the pulse signal so that pulses thereof exist in an arbitrary portion of a total time period for forming one dot depending on the input digital image data.

15. The image forming apparatus as claimed in claim 9 wherein said pulse generating means generates the pulse signal so that pulses thereof exist in an approximate center portion of a total time period for forming one dot depending on the input digital image data.

* * * * *